(12) United States Patent
Lin et al.

(10) Patent No.: US 10,576,669 B2
(45) Date of Patent: Mar. 3, 2020

(54) INJECTION MOLDING DEVICE AND INJECTION METHOD THEREOF

(71) Applicant: RAYSPERT PRECISION INDUSTRIAL INC., Tainan (TW)

(72) Inventors: Shun-Fu Lin, Tainan (TW); Yu-Chang Su, Tainan (TW)

(73) Assignee: RAYSPERT PRECISION INDUSTRIAL INC., Tainan (TW)

( * ) Notice: Subject to any disclaimer, the term of this patent is extended or adjusted under 35 U.S.C. 154(b) by 59 days.

(21) Appl. No.: 16/132,452

(22) Filed: Sep. 16, 2018

(65) Prior Publication Data

US 2019/0389100 A1 Dec. 26, 2019

(30) Foreign Application Priority Data

Jun. 22, 2018 (TW) .............................. 107121457 A

(51) Int. Cl.
*B29C 44/42* (2006.01)
*B29C 44/58* (2006.01)
(Continued)

(52) U.S. Cl.
CPC ........ *B29C 44/428* (2013.01); *B29C 44/0415* (2013.01); *B29C 44/3415* (2013.01); *B29C 44/588* (2013.01); *B29C 45/0025* (2013.01); *B29C 45/2602* (2013.01); *B29C 45/2608* (2013.01); *B29C 45/2737* (2013.01);
(Continued)

(58) Field of Classification Search
CPC . B29C 44/428; B29C 44/588; B29C 44/0415; B29C 44/3415; B29C 45/34; B29C 45/2737; B29C 45/0025; B29C 45/2608; B29C 45/2602; B29C 2945/76381; B29C 2945/76561; B29C 2945/76498; B29C 2945/76257; B29C 2945/76006; B29L 2031/507

See application file for complete search history.

(56) References Cited

U.S. PATENT DOCUMENTS

| | | | | |
|---|---|---|---|---|
| 4,208,368 A | * | 6/1980 | Egli | .................... B29C 44/0415 264/45.5 |
| 2018/0319054 A1 | * | 11/2018 | Huang | .................... B29C 44/58 |
| 2018/0370108 A1 | * | 12/2018 | Lawless, III | .......... B29C 45/762 |

* cited by examiner

*Primary Examiner* — Nahida Sultana
(74) *Attorney, Agent, or Firm* — Bruce Stone LLP; Joseph Bruce

(57) ABSTRACT

Provided is an injection molding device, including an injection port arranged on an upper mold base; an upper mold arranged in the upper mold base, wherein at least one ejection port, a gasket groove and a gasket are provided and the ejection portion is connected to the injection port; a lower mold base operatively aligned with or separated from the upper mold base and provided with at least one gas passage for the gas to enter or exit; and a lower mold disposed on the lower mold base. The lower mold base is aligned with or separated from the upper mold base, the lower mold is provided with a mold cavity and at least one shaped air path is provided to connect the mold cavity with the gas passage. The lower mold is a porous material and has a plurality of pores. Gas is pre-injected into the mold cavity through the gas passage and at least one air path to maintain a preset pressure inside the mold cavity. Gas is spewed out through the plurality of pores, thereby causing a finished product to exit the mold cavity. In addition, the present disclosure also provides an injection molding method.

9 Claims, 8 Drawing Sheets

(51) Int. Cl.
  *B29C 44/34* (2006.01)
  *B29C 44/04* (2006.01)
  *B29L 31/50* (2006.01)
  *B29C 45/26* (2006.01)
  *B29C 45/00* (2006.01)
  *B29C 45/27* (2006.01)
  *B29C 45/34* (2006.01)
  *B29K 105/04* (2006.01)

(52) U.S. Cl.
  CPC ........ *B29C 45/34* (2013.01); *B29C 2045/279* (2013.01); *B29C 2945/76006* (2013.01); *B29C 2945/76257* (2013.01); *B29C 2945/76381* (2013.01); *B29C 2945/76498* (2013.01); *B29C 2945/76545* (2013.01); *B29C 2945/76561* (2013.01); *B29K 2105/041* (2013.01); *B29L 2031/507* (2013.01)

B-B

INJECTION MOLDING DEVICE AND INJECTION METHOD THEREOF

BACKGROUND OF THE INVENTION

1. Field of the Invention

The present disclosure relates to an injection molding device.

2. The Prior Arts

The injection molding machine, also known as an EVA injection machine or an injection machine, is a device or a machine that is mainly used to manufacture a plastic product. The injection molding machine is composed of two main parts: a clamping unit an injection unit.

However, it is generally known that thermoplastic polyurethanes (TPU) raw materials must be subjected to a baking process to remove moisture contained. Water vapor will cause bubbles to be generated on the surface of a finished product when the raw materials are formed in the mold. Physical foaming will also have the same situation, which will result in a rough surface of a finished product. The initial embryo after foaming is subjected to surface processing to overcome the aforementioned problems, thereby increasing the process steps.

Moreover, the abovementioned injection molding method allows the raw materials to be injected into the mold to be heated and foamed. The gas pressure in the mold is not consistently controlled so that the gas and the raw materials cannot be completely fused/merged or separated during the faming process, thereby causing the finished product to have the problems of partial hard blocks and uneven foaming. Moreover, when the raw materials are continuously injected into the interior of the mold and the mold is not effectively exhausted, this will cause incomplete filling and foaming porosity, which are commonly known as the entrapped air phenomenon. Such phenomenon will increase the defective rate of the finished products.

In addition, in order to facilitate the removal of the finished products from the mold, the conventional methods are to spray the release agent in the mold to prevent the molding material from adhering to the inner wall of the mold. A removing device for taking out the finished products from the mold is provided. However, the release agent may remain on the inner wall of the mold, and will affect the subject process steps. Further, the spraying and the subsequent clearing operations are required. As such, how to provide a better injection molding device and a better injection molding method thereof has become one of the important issues.

SUMMARY OF THE INVENTION

It is a primary object of the present disclosure to provide an injection molding device, so that the surface of a finished product is smooth and the entrapped air phenomenon can be improved. Therefore, the process can be shortened.

Moreover, another object of the present disclosure is to provide an injection molding method, so that the raw materials do not need to be dried and the time for front work can be saved.

In order to achieve the above objective, the present disclosure provides an injection molding device, an upper mold base, having an upper mold base groove and an injection port, wherein the injection port is connected to the injection molding machine; an upper mold, arranged inside the upper mold base groove and having an ejection port, a gasket groove and a gasket, wherein the ejection port is connected to the injection port; a lower mold base, operatively aligning or separating from the upper mold base and having a lower mold base groove and at least one gas passage, wherein the at least one gas passage allows gas to enter and exit; and a lower mold, arranged inside the lower mold base groove and having a mold cavity, wherein the lower mold together with the lower mold base aligns and separates from the upper mold together with the upper mold base, the lower mold includes at least one shaped air path that is connected to the mold cavity and the at least one gas passage, the lower mold is a porous material, the porous material enables the lower mold to have a plurality of pores; when the lower mode base is aligned with the upper mold base, the interior of the mold cavity is pre-injected with gas through the at least one gas passage and the at least one shaped air path to maintain a predetermined pressure inside the mold cavity; when a raw material in the injection molding machine enters the mold cavity during a forming process, the gas is gradually released from the mold cavity by controlling a rate, so that the raw material completely fills the mold cavity; when a finished product is formed in the mold cavity and the lower mold base is separated from the upper mold base, the gas is ejected from the at least one gas passage through the at least one shaped air path to the plurality of pores, so that the finished product is separated from the mold cavity.

Preferably, the present disclosure further includes a control device, controlling an amount and timing of incoming and outgoing gases and adjusting the pressure in the mold cavity, wherein the injection molding machine is controlled by the control device to control a flow of the raw material into the mold cavity.

Preferably, the upper mold is a porous material; the porous material enables the upper mold to have a plurality of pores.

Preferably, the at least one shaped air path of the lower mold is formed by three-dimensional printing or processed by a gas permeable steel.

Preferably, the at least one shaped air path includes at least one main air duct and a plurality of secondary air ducts, the at least one main air duct is disposed around the mold cavity and the bottom thereof, and communicates with the at least one gas passage, each of the plurality of secondary air ducts is arranged at the intervals between the main air duct and the mold cavity, and one end of each of the plurality of secondary air ducts communicates with the main air duct, the other end thereof is connected to the mold cavity.

Preferably, the gasket groove is disposed around the ejection port, the gasket is disposed in the gasket groove, one side of the gasket is fitted to the bottom of the gasket groove, and another side of the gasket is attached to the lower mold when the lower mold base is aligned with the upper mold base.

Preferably, the upper mold base and the lower mold base further include at least one cooling waterway.

Preferably, a valve for preventing backflow of the gas is provided between the control device and the at least one gas passage.

Preferably, the present disclosure further includes a pressure measuring unit, sensing the internal pressure of the mold cavity and is electrically connected to the control device.

DETAILED DESCRIPTION OF THE PREFERRED EMBODIMENT

The detailed description of the present disclosure is provided in combination with the accompanying drawings.

Referring to FIGS. 1-7, according to a preferred embodiment of the present disclosure, an injection molding device of the present disclosure for use with an injection molding machine, more particularly, a MUCELL micro-foam injection molding machine or a chemical-foam injection molding machine, mainly includes an upper mold base 10, an upper mold 20, a lower mold 30 and a lower mold base 40.

Figure 7:
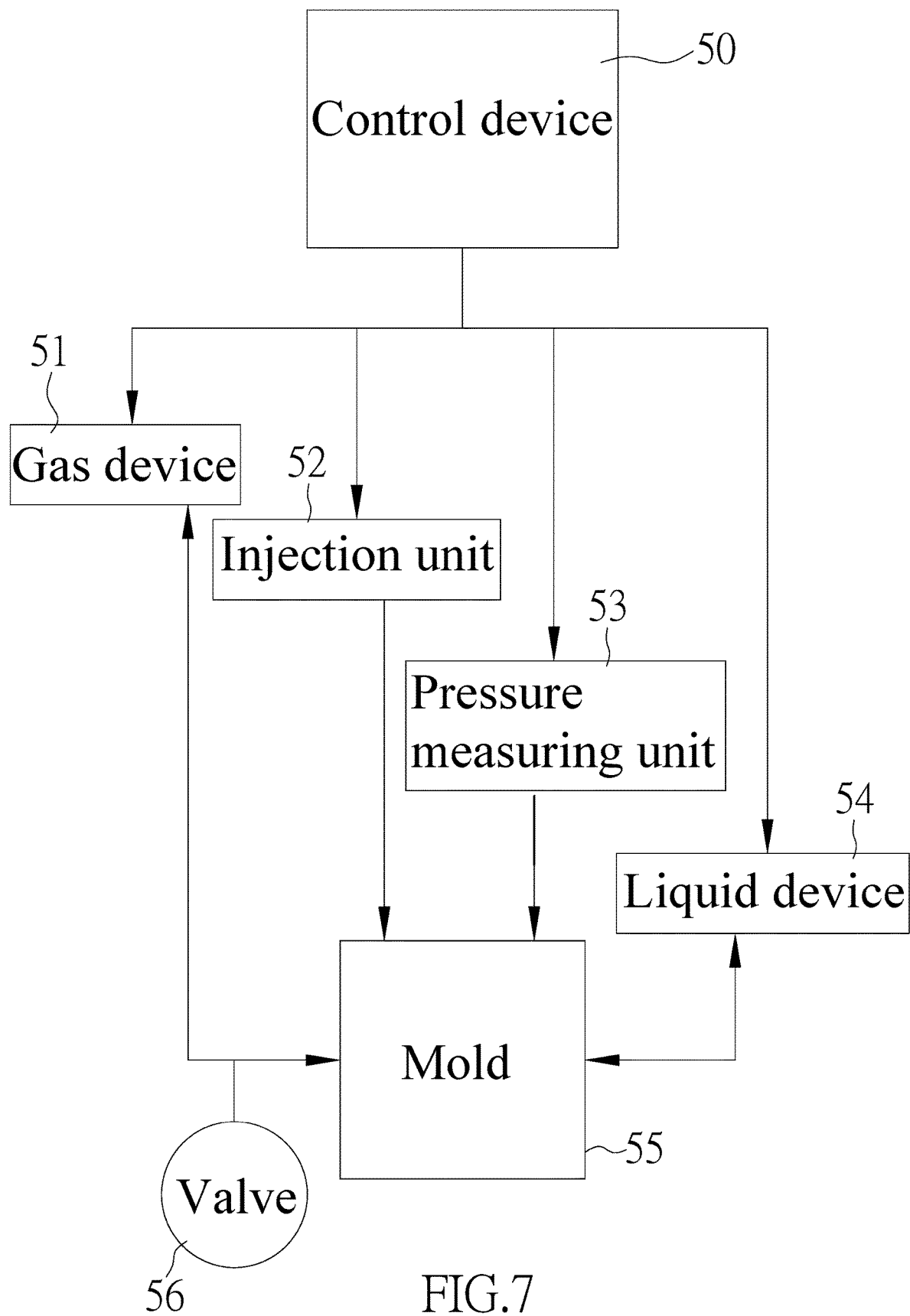
FIG. 7 shows a block diagram of the injection molding device according to the preferred embodiment of the present disclosure.

One side of the upper mold base 10 is a first matching surface 104. The first matching surface 104 has an upper mold base groove 101. Another side of the upper mold base 10 has an injection port 102. The injection port 102 of the upper mold base 10 is connected to one end of the injection molding machine 52. The upper mold 20 is arranged inside the upper mold base groove, and has two ejection ports 201, a gasket groove 202 and a gasket 203. Each of the ejection ports 201 is connected to the injection port 102. In an embodiment of the present disclosure, the upper mold 20 has two ejection ports, but they are not limited to the present disclosure. The material of the upper mold 20 is a porous material and the porous material enables the upper mold 20 to have a plurality of pores. In addition, the upper mold base 10 also includes at least one cooling waterway 103 and the upper mold 20 also includes at least one cooling circuit that is connected to the at least one cooling waterway 103 of the upper mold base 10. Referring to FIG. 7, the at least one cooling waterway 103 is connected to a liquid device. The internal cooling liquid (not shown) is circuited inside the at least one cooling waterway and the at least one cooling circuit, thereby maintaining the upper mold base 10 and the upper mold 20 within a predetermined temperature value. Moreover, the upper mold 20 includes a gasket groove 202 that is arranged around the ejection port 201. A gasket 203 is disposed inside the gasket groove 202. One side of the gasket 203 is attached to the bottom of the gasket groove 202.

One side of the lower mold base 40 is a second matching surface 404, and operatively aligns or separates from the first matching surface 104 of the upper mold base 10. The second matching surface 404 has a lower mold base groove 401 and at least one gas passage 402. The at least one gas passage is used for gas (not shown) in and out of a gas device 51. The lower mold 30 is a porous material. The porous material enables the lower mold 30 to have a plurality of pores. The lower mold 30 is aligned with and is separated from the upper mold 20. The lower mold 30 is arranged inside the lower mold base groove 401. The lower mold 30 includes a mold cavity 301 and at least one shaped air path 302. The present disclosure does not limit the manner in which the at least one shaped air path 302 of the lower mold 30 is formed. Preferably, the at least one shaped air path 302 of the lower mold is formed by three-dimensional printing or processed by a gas permeable steel. In an embodiment of the present disclosure, the In the preferred embodiment of the present disclosure, the at least one shaped air path 302 includes at least one main air duct 3021 and a plurality of secondary air ducts 3022. The at least one main air duct 3021 is disposed around the mold cavity 301, and communicates with the at least one gas passage 402. Each of the plurality of secondary air ducts 3022 is arranged at the intervals between the main air duct 3021 and the mold cavity 301. One end of each of the plurality of secondary air ducts 3022 communicates with the main air duct 3021 and the other end thereof is connected to the mold cavity 301. The above embodiment of the present disclosure does not limit the structure of the at least one air path 302.

Moreover, the lower mold base 40 includes at least one cooling waterway 403. The at least one cooling circuit 303 of the lower mold 30 is connected to the at least one cooling waterway 403 of the lower mold base 40. Referring to FIG. 7, the at least one cooling waterway 403 communicates with the liquid device 54. An internal cooling liquid (not shown) circulates inside the at least one cooling waterway 403 and the at least one cooling circuit 303 so as to maintain the lower mold base 40 and the lower mold 30 within a predetermined temperature value.

Referring to FIG. 7, the present disclosure further includes a control device 50. The control device 50 controls an amount and timing of incoming and outgoing gases, and also adjusts the pressure in the mold cavity 301. The injection molding machine 52 is also controlled by the control device 50 to control a flow of the raw material into the mold cavity 301. In addition, a valve 56 for preventing backflow of the gas is provided between the control device 50 and the at least one gas passage 402, so as to change the pressure in the mold cavity 301. Moreover, the present disclosure further includes a pressure measuring unit 53. The pressure measuring unit 53 is electrically connected to the control device 50, and senses the internal pressure of the mold cavity 301. Therefore, the control device 50 is able to adjust the pressure in the mold cavity 301 at any time according to the data change of the pressuring measuring unit 53, so as to keep it within a preset value.

Figure 1:
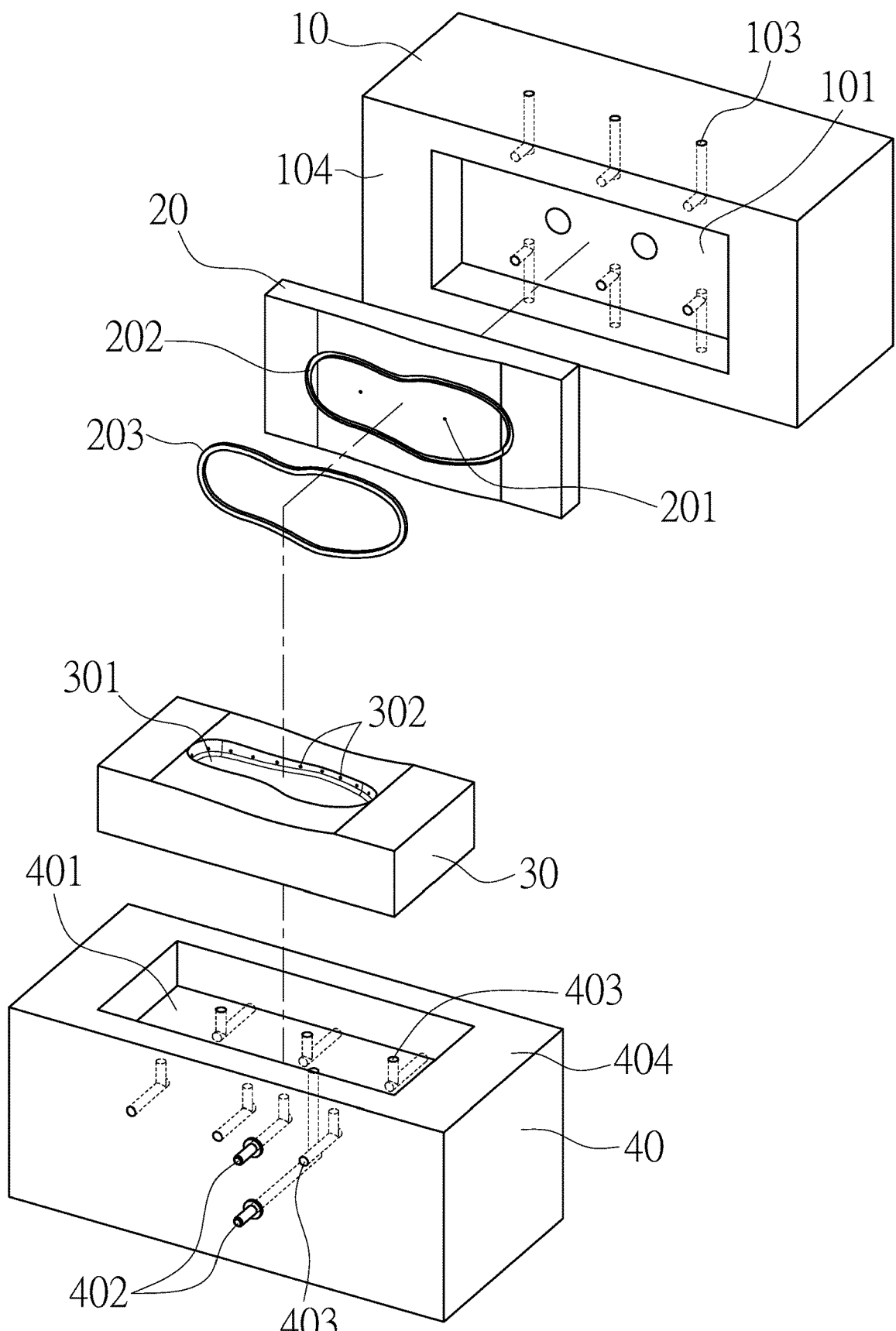
FIG. 1 shows an exploded perspective view of an injection molding device according to a preferred embodiment of the present disclosure.
Figure 2:
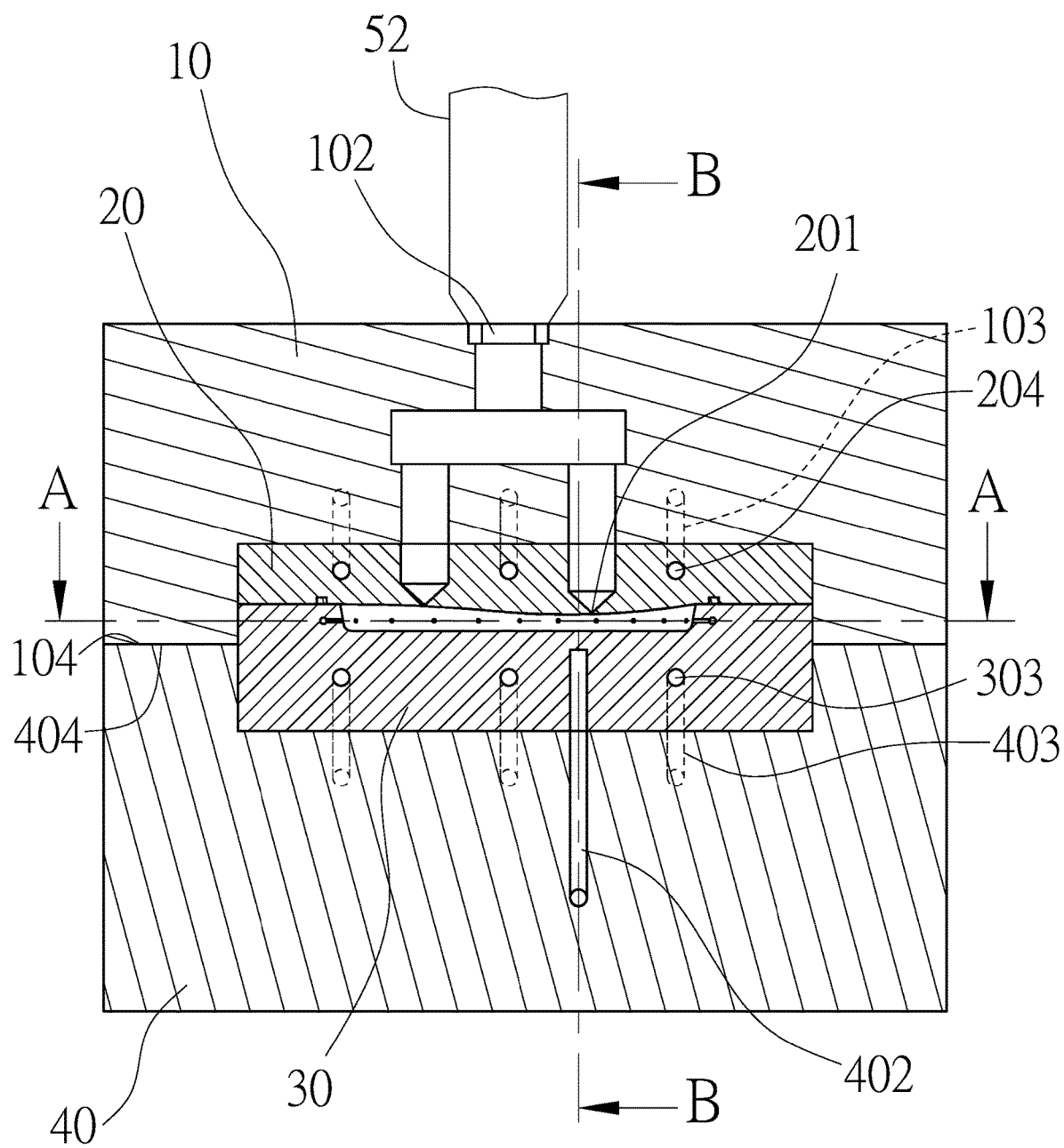
FIG. 2 shows a schematic diagram of the injection molding device according to the preferred embodiment of the present disclosure.
Figure 3:
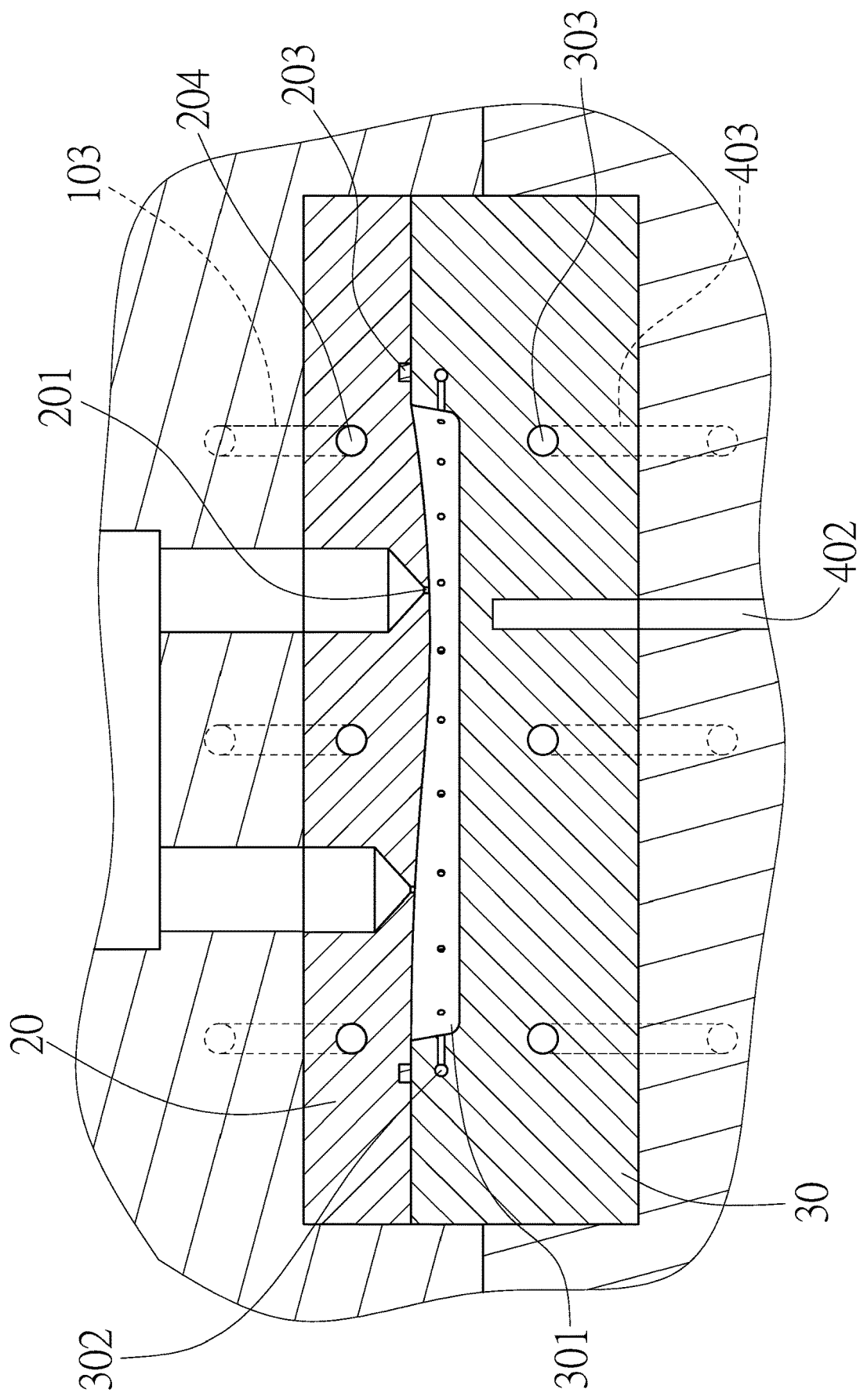
FIG. 3 shows a partial enlarged schematic diagram of the injection molding device shown in FIG. 2 according to the preferred embodiment of the present disclosure.
Figure 4:
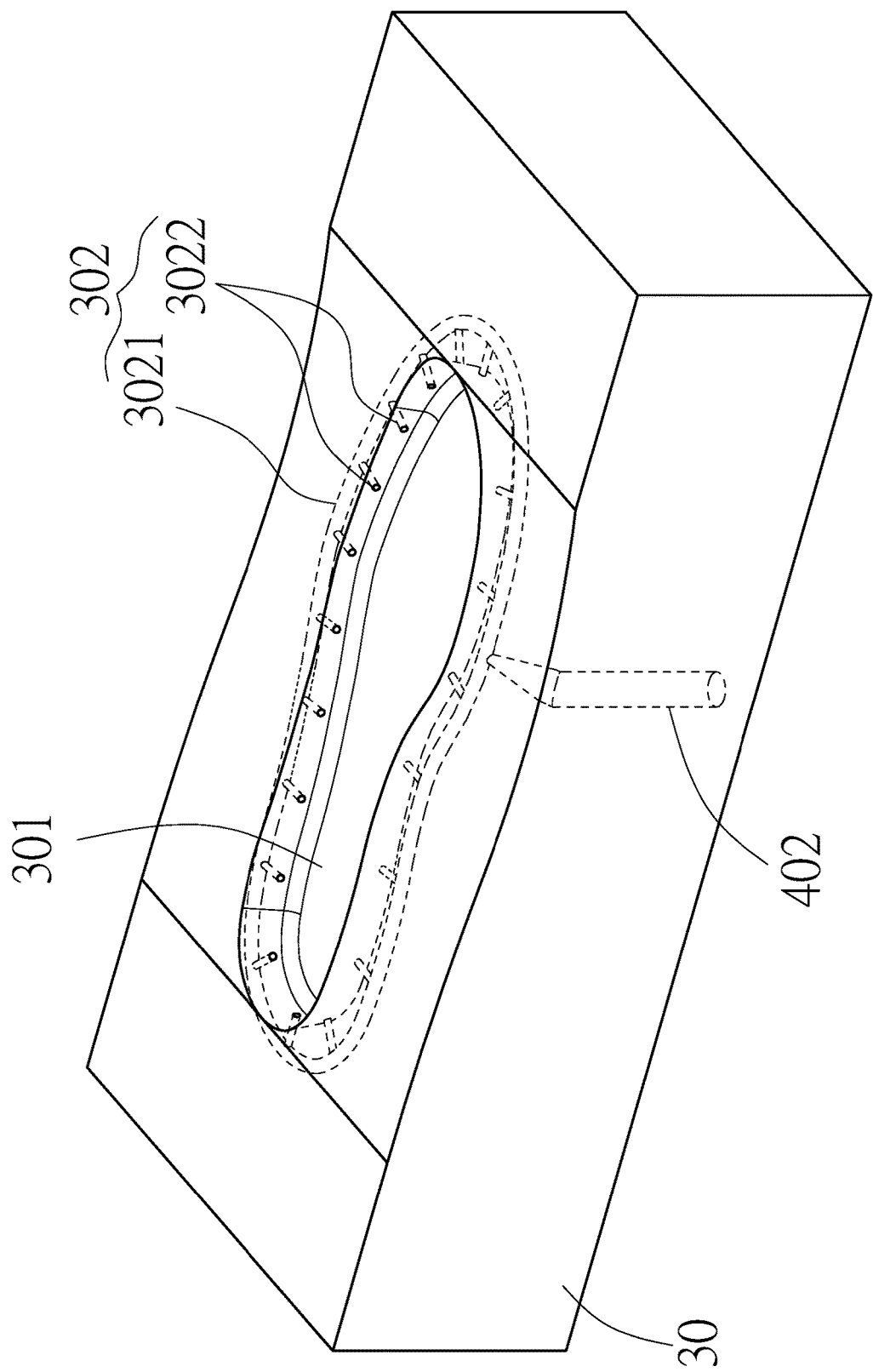
FIG. 4 shows a stereoscopic diagram of a lower mold of the injection molding device according to the preferred embodiment of the present disclosure.
Figure 5:
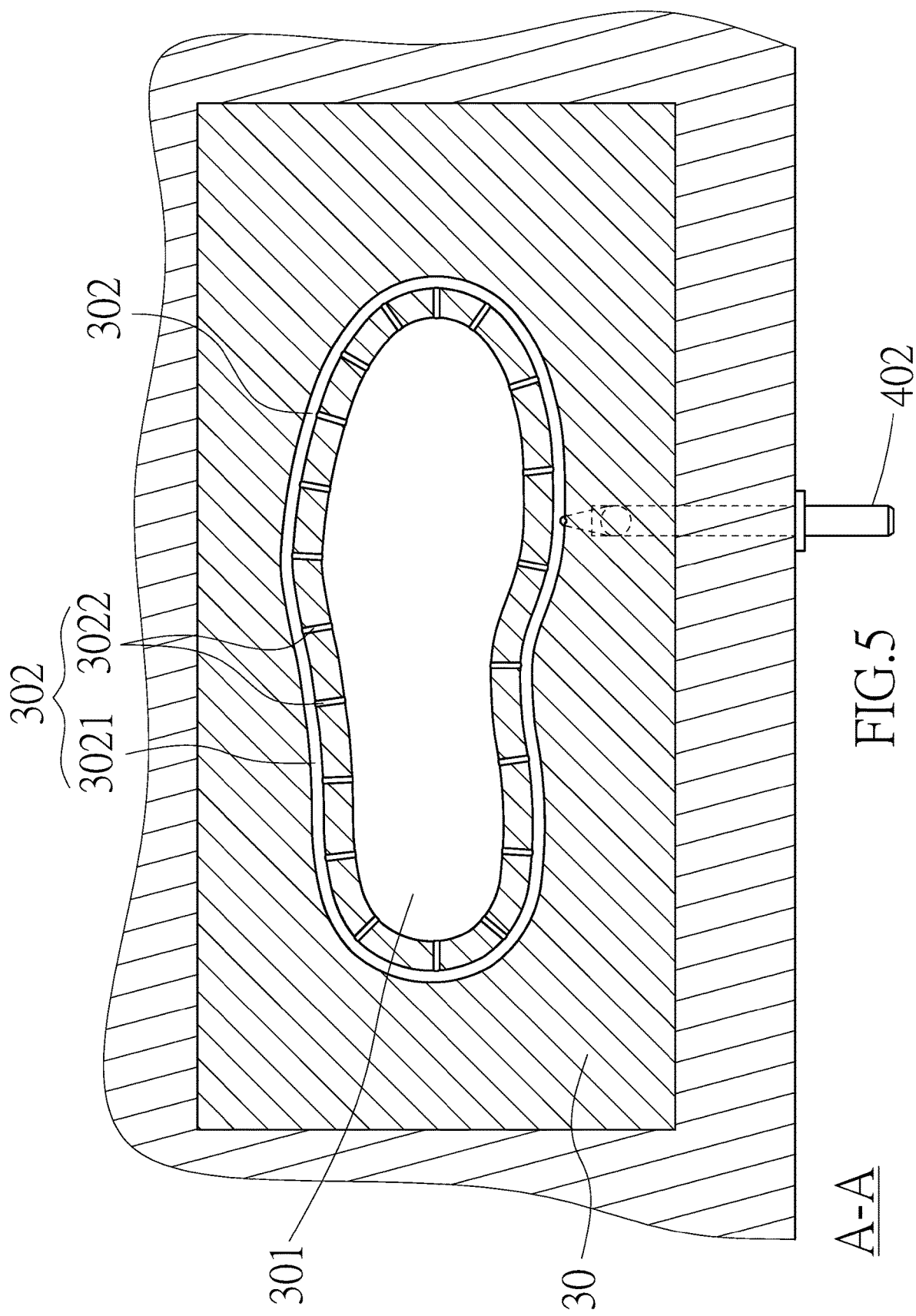
FIG. 5 shows an A-A sectional view of FIG. 2 according to the preferred embodiment of the present disclosure.
Figure 6:
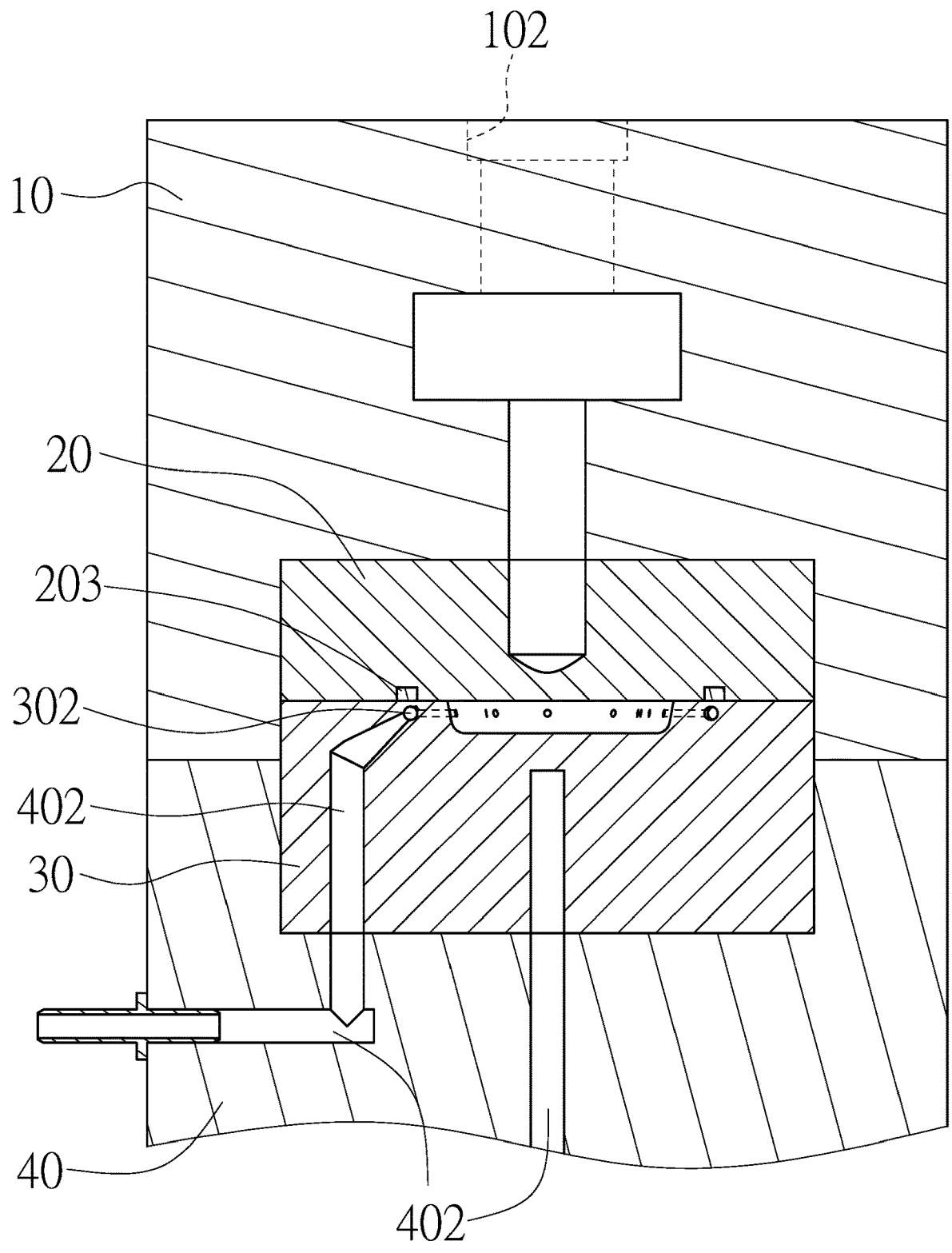
FIG. 6 shows a B-B sectional view of FIG. 2 according to the preferred embodiment of the present disclosure.

According to the present disclosure, when the lower mold base 40 is aligned with the upper mold base 10, the control device 50 controls the gas device 51 to pre-inject gas through the at least one gas passage 402 the at least one shaped air path 302 to maintain a preset pressure inside the mold cavity 301, thereby forming a back pressure state. Referring to FIG. 1, it is worth mentioning that the gasket groove 202 is disposed around the ejection port 201; that is, the gasket 203 can be disposed in the gasket groove 202, and is attached to the upper mold 20 and the lower mold 30, so as to keep a closed space when the upper mold base 10 is aligned with the lower mold base 30. Therefore, the pressure in the mold cavity 301 can be controlled so that the gas leakage can be effectively prevented.

According to the present disclosure, when the raw material of a gas and liquid mixture is injected into the mold cavity 301 through the injection port 102, the internal pressure of the mold cavity 301 changes due to the injection of the raw material. The control device 50 adjusts the flow rate of gas according to the pressure data detected by the pressure measuring 53. When the raw material gradually fills the mold cavity 301, the gas is gradually withdrawn from the mold cavity 301 so that the gravitational force is generated inside the mold cavity 301 and the entrapped air phenomenon does not occur.

Moreover, when a finished product (not shown) has been formed in the mold cavity 301, the lower mold base 40 is separated from the upper mold base 10. The control device 50 controls the gas to overflow from the at least one gas passage 402 through the at least one shaped air passage 302 and the plurality of pores, thereby separating the finished product from the mold cavity 301. Compared with the prior art, the present disclosure can automatically release the finished product without spraying the release agent in the mold cavity, and does not require any additional removal device. As such, the forming process can be shortened according to the present disclosure.

FIG. 7 shows a block diagram of the injection molding device according to the present disclosure. As shown in FIG. 7, the control device 50 controls a gas device 51, an injection unit 52, a pressure measuring unit 53 and a liquid device 54, a mold 55 and a valve 56. The mold 55 refers to a state in which the upper mold base 10, the upper mold 20, the lower mold base 40 and the lower mold 30 are combined. The control device 50 controls the amount of incoming and outgoing gases, the program and the time, and adjusts the pressure in the mold cavity 301. When the mold cavity 301 exceed the preset pressure, the gas can be evacuated through the at least one shaped air path 302. When the pressure in the mold cavity 301 is lower than a preset value, the pressure in the mold cavity 301 can also be increased by the control device 50, thereby maintaining a certain pressure in the mold cavity 301.

On the contrary, the back pressure state is mainly for the finished product with a smooth surface. The gas generates resistance to the injected mixture raw material, so that the surface of the injected mixture raw material forms a mutual resistance with the gas, and is squeezed to form a smooth surface. After the finished product is formed, the control device 50 controls the pressure to naturally overflow or withdraw.

According to the preferred embodiments of the present disclosure, if the present disclosure is used to make a shoe pad, the raw material required for the shoe pad is relatively soft, thereby maintaining the pressure between 7 bar and 9 bar in the mold cavity; if the present disclosure is used to make a snow frame, the raw material required for the snow frame is relatively hard, thereby probably maintaining the pressure between 60 bar and 70 bar in the mold cavity (the pressure value will be set according to the product properties). Therefore, when the manufactured products are different, the pressure range in the mold cavity is generally set between 2 bar and 100 bar, but not limited to the present disclosure.

Figure 8:
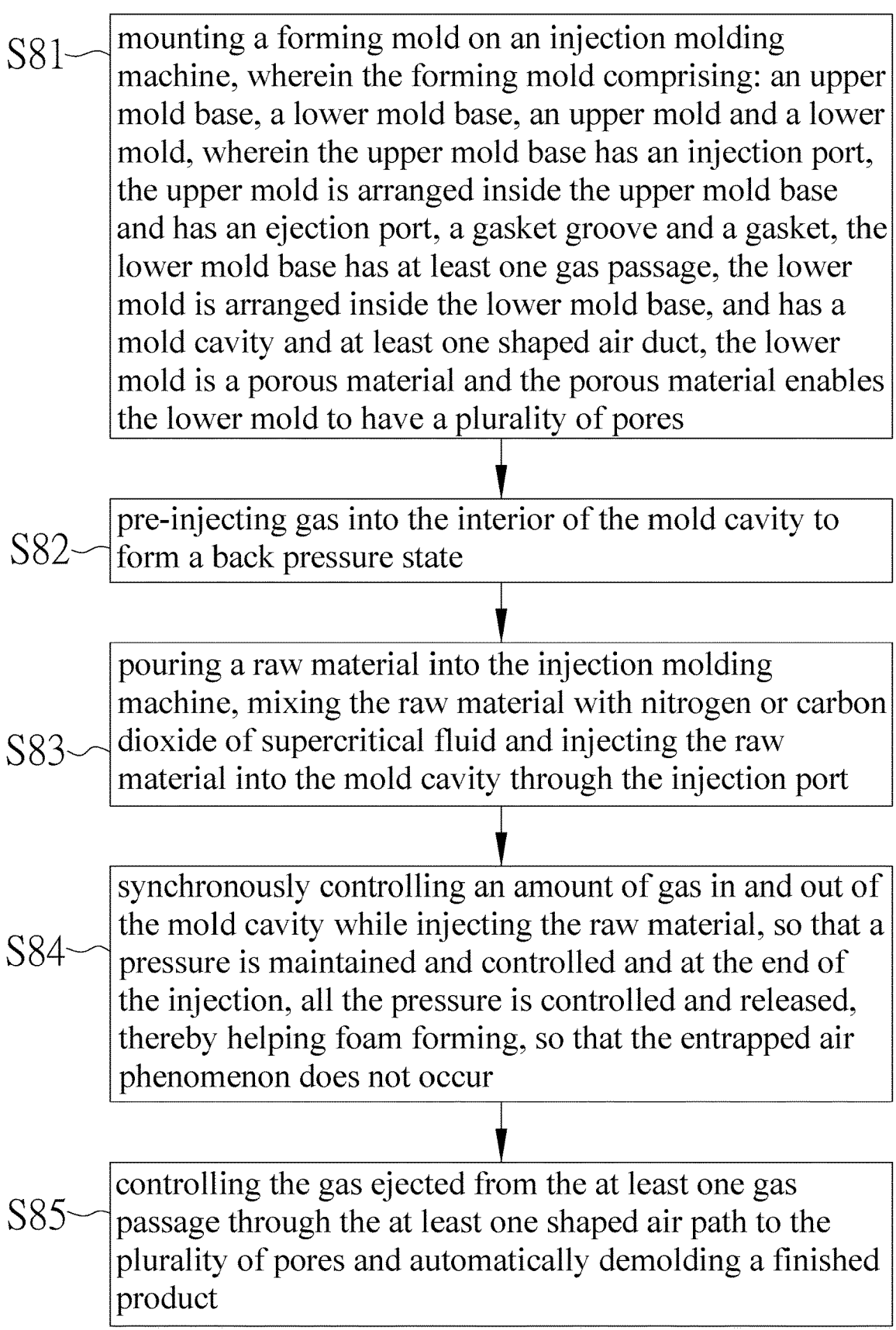
FIG. 8 shows a flow chart of an injection molding method according to the preferred embodiment of the present disclosure.

In addition, as shown in FIG. 8, the present disclosure also provide an injection molding method, including the following steps S81-S85: step S81: mounting a forming mold on an injection molding machine, wherein the forming mold comprising: an upper mold base, a lower mold base, an upper mold and a lower mold, wherein the upper mold base has an injection port, the upper mold is arranged inside the upper mold base and has an ejection port, a gasket groove and a gasket, the lower mold base has at least one gas passage, the lower mold is arranged inside the lower mold base, and has a mold cavity and at least one shaped air duct, the lower mold is a porous material and the porous material enables the lower mold to have a plurality of pores; step S82: pre-injecting gas into the interior of the mold cavity to form a back pressure state; step S83: pouring a raw material into the injection molding machine, mixing the raw material with nitrogen or carbon dioxide of supercritical fluid and injecting the raw material into the mold cavity through the injection port; step S84: synchronously controlling an amount of gas in and out of the mold cavity while injecting the raw material, so that a pressure is maintained and controlled and at the end of the injection, all the pressure is controlled and released, thereby helping foam forming, so that the entrapped air phenomenon does not occur; and step S85: controlling the gas ejected from the at least one gas passage through the at least one shaped air path to the plurality of pores and automatically demolding a finished product.

According to the present disclosure, the injection molding machine in step S81 is especially a MUCELL micro-foaming injection molding machine or a chemical-foaming injection molding machine, but is not used to limit the type of the injection molding machine. The finished product formed by the MUCELL micro-foaming injection molding machine or the chemical-foaming injection molding machine together with the injection molding machine of the present disclosure has no bubble holes on the surface thereof and the inside thereof is more finely foamed. Therefore, according to the present disclosure, the entrapped air phenomenon does not occur in order to facilitate the shape integrity of the finished product.

In summary, the injection molding device and the injection molding method according to the present disclosure have the following advantages: 1. the surface of a finished product is smooth, for example, a smooth shoe sole and a smooth shoe pad; 2. the strength and shock resistance of a finished product can be increased, because the overall foaming of a finished product is uniform as compared with the conventional technology; 3. the entrapped air problem can be effectively resolved; 4. the process steps can be saved a lot, so that the manufacturing time of a product can be shortened; and 5. production capacity is increased and costs are saved, so as to achieve energy saving and carbon reduction.

Although the present disclosure has been described with reference to the preferred exemplary preferred embodiments thereof, it is apparent to those skilled in the art that a variety of modifications and changes may be made without departing from the scope of the present disclosure which is intended to be defined by the appended claims.

What is claimed is:

1. An injection molding device for use with an injection molding machine, comprising:
   an upper mold base, having an upper mold base groove and an injection port, wherein the injection port is connected to the injection molding machine;
   an upper mold, arranged inside the upper mold base groove and having an ejection port, a gasket groove and a gasket, wherein the ejection port is connected to the injection port;

a lower mold base, operatively aligning or separating from the upper mold base and having a lower mold base groove and at least one gas passage, wherein the at least one gas passage allows gas to enter and exit; and a lower mold, arranged inside the lower mold base groove and having a mold cavity, wherein the lower mold together with the lower mold base aligns and separates from the upper mold together with the upper mold base, the lower mold includes at least one shaped air path that is connected to the mold cavity and the at least one gas passage, the lower mold is a porous material, the porous material enables the lower mold to have a plurality of pores; when the lower mold base is aligned with the upper mold base, the interior of the mold cavity is pre-injected with gas through the at least one gas passage and the at least one shaped air path to maintain a predetermined pressure inside the mold cavity;

when a raw material in the injection molding machine enters the mold cavity during a forming process, the gas is gradually released from the mold cavity by controlling a rate, so that the raw material completely fills the mold cavity;

when a finished product is formed in the mold cavity and the lower mold base is separated from the upper mold base, the gas is ejected from the at least one gas passage through the at least one shaped air path to the plurality of pores, so that the finished product is separated from the mold cavity.

2. The injection molding device of claim 1, further comprising: a control device, controlling an amount and timing of incoming and outgoing gases and adjusting the pressure in the mold cavity, wherein the injection molding machine is controlled by the control device to control a flow of the raw material into the mold cavity.

3. The injection molding device of claim 1, wherein the upper mold is a porous material, the porous material enables the upper mold to have a plurality of pores.

4. The injection molding device of claim 1, wherein the at least one shaped air path of the lower mold is formed by three-dimensional printing or processed by a gas permeable steel.

5. The injection molding device of claim 1, wherein the at least one shaped air path includes at least one main air duct and a plurality of secondary air ducts, the at least one main air duct is disposed around the mold cavity and the bottom thereof, and communicates with the at least one gas passage, each of the plurality of secondary air ducts is arranged at the intervals between the at least one main air duct and the mold cavity, and one end of each of the plurality of secondary air ducts communicates with the at least one main air duct, the other end thereof is connected to the mold cavity.

6. The injection molding device of claim 1, wherein the gasket groove is disposed around the ejection port, the gasket is disposed in the gasket groove, one side of the gasket is fitted to the bottom of the gasket groove, and another side of the gasket is attached to the lower mold when the lower mold base is aligned with the upper mold base.

7. The injection molding device of claim 1, wherein the upper mold base and the lower mold base further comprise at least one cooling waterway.

8. The injection molding device of claim 2, wherein a valve for preventing backflow of the gas is provided between the control device and the at least one gas passage.

9. The injection molding device of claim 1, further comprising: a pressure measuring unit, sensing the internal pressure of the mold cavity and is electrically connected to a control device.

* * * * *